United States Patent Office 3,301,813
Patented Jan. 31, 1967

3,301,813
PROCESS FOR INCORPORATING A LIQUID ADDITIVE INTO A SOLID THERMOPLASTIC POLYMER
Ronald H. Dahms, Springfield, and Edgar E. Hardy, Longmeadow, Mass., and Daniel A. Popielski, Cincinnati, Ohio, assignors to Monsanto Company, a corporation of Delaware
No Drawing. Filed Mar. 22, 1963, Ser. No. 267,344
14 Claims. (Cl. 260—34.2)

This invention relates to a method of incorporating liquid additives into solid, thermoplastic polymers and more particularly relates to an economical method of incorporating the liquid additives so as to form dry, easily-processed compositions having the liquid additives uniformly dispersed therein.

In preparing solid, thermoplastic polymers for consumer use, it is conventional to incorporate various additives such as plasticizers, lubricants, flame retardants, pneumatogens, etc., some of which are liquid materials. Heretofore, the incorporation of liquid additives into polymers has presented problems because of the difficulty of achieving a uniform dispersion of the liquid additives in the solid polymers without using special, expensive equipment and because of the relatively low limitations on the amount of liquid additive which can be incorporated when this special equipment is used. Thus, the incorporation of liquid additives has previously required the use of expensive equipment or has resulted in the formation of compositions in which the additives were poorly dispersed and which were wet and difficult to process.

An object of the invention is to provide a novel process for incorporating liquid additives into solid, thermoplastic polymers.

Another object is to provide an economical process for incorporating these liquid additives so as to prepare dry, easily-processed compositions having the liquid additives uniformly dispersed therein.

These and other objects are attained by incorporating a liquid additive into a solid, thermoplastic polymer by a concentrate technique which comprises premixing the liquid additive with a substantially anhydrous, porous emulsion polymer at a temperature below the fusion temperature of the emulsion polymer to form a concentrate containing about 40–60% by weight of the liquid additive and blending the concentrate with the solid, thermoplastic polymer. The emulsion polymer is a polymer which is compatible with the solid, thermoplastic polymer, advantageously a polymer which has substantially the same chemical composition as the solid, thermoplastic polymer.

The following examples are given to illustrate the invention and are not intended as a limitation thereof. Unless otherwise specified, quantities mentioned are quantities by weight.

EXAMPLE 1

Part A.—Control

Mix bis(2-bromoethyl) 2-chloroethyl phosphate with a commercial polystyrene having a Staudinger average molecular weight of about 60,000 to form a composition containing about 5.5% bis(2-bromoethyl) 2-chloroethyl phosphate. The composition is visibly wet and cannot be extruded because of hopper packing and slippage or blocking on the extruder screw.

Part B

Blend 60 parts of bis(2-bromoethyl) 2-chloroethyl phosphate with 40 parts of a substantially dry, porous emulsion polystyrene at room temperature to form a concentrate. Blend the concentrate with a commercial polystyrene having a Staudinger average molecular weight of about 60,000 to form a composition containing about 5.5% bis(2-bromoethyl) 2-chloroethyl phosphate. The composition is dry, has the bis(2-bromoethyl) 2-chloroethyl phosphate uniformly dispersed therein, and extrudes easily.

EXAMPLE II

Part A.—Control

Mix tris(2,3-dibromopropyl) phosphate and a polyethylene glycol with a commercial polystyrene having a Staudinger average molecular weight of about 55,000 to form a composition containing about 6% tris(2,3-dibromopropyl) phosphate and about 1% polyethylene glycol. The composition is visibly wet and cannot be extruded because of hopper packing and slippage or blocking on the extruder screw.

Part B

Blend 55 parts of tris(2,3-dibromopropyl) phosphate with 45 parts of a substantially dry, porous emulsion polystyrene at room temperature to form a concentrate. Blend the concentrate with a polyethylene glycol and a commercial polystyrene having a Staudinger average molecular weight of about 55,000 to form a composition containing about 6% tris(2,3-dibromopropyl) phosphate and about 1% polyethylene glycol. The composition is dry, has the tris(2,3-dibromopropyl) phosphate uniformly dispersed therein, and extrudes easily.

EXAMPLE III

Part A.—Control

Mix tris(2,3-dibromopropyl) phosphate with a commercial rubber-modified polystyrene containing about 6.5% of a rubbery butadiene-styrene (75:25) copolymer to form a composition containing about 5.7% tris(2,3-dibromopropyl) phosphate. The composition is visibly wet and cannot be extruded because of hopper packing and slippage or blocking on the extruder screw.

Part B

Blend 60 parts of tris(2,3-dibromopropyl) phosphate with 40 parts of a substantially dry, porous emulsion polystyrene at room temperature to form a concentrate. Blend the concentrate with a commercial rubber-modified polystyrene containing about 6.5% of a rubbery butadiene-styrene (75:25) copolymer to form a composition containing about 5.7% tris(2,3-dibromopropyl) phosphate. The composition is dry, has the tris(2,3-dibromopropyl) phosphate uniformly dispersed therein, and extrudes easily.

Dry, easily-processed compositions having the liquid additive uniformly dispersed therein are also obtained when other liquid additives, e.g., lubricants such as mineral oils, butyl stearate, etc.; plasticizers such as dibutyl phthalate, etc.; pneumatogens such as the pentanes, hexanes, heptanes, etc., are incorporated into solid, thermoplastic polymers such as styrene-acrylonitrile copolymers, styrene-alpha-methylstyrene copolymers, styrene-methyl methacrylate copolymers, styrene-alpha-methylstyrene-acrylonitrile terpolymers, poly-p-t-butylstyrene, polyethylene, polyacrylonitrile, polymethyl methacrylate, etc., via concentrates containing 40–60% by weight of the liquid additive and 60–40% by weight of a substantially anhydrous, porous emulsion polymer which is compatible with the polymer to be modified. When the emulsion polymer has the same chemical composition as the solid, thermoplastic polymer and contains no contaminating emulsifying agents other than emulsifying agents which are compatible with the solid, thermoplastic polymer, the compositions are optically clear.

The invention is applicable to the incorporation of liquid additives into any solid, thermoplastic polymer which is compatible with a polymer which can be prepared by emulsion polymerization. Exemplary of such solid, thermoplastic polymers are vinylidene polymers such as the polymers of one or more monomers of the group consisting of olefins (e.g., ethylene, propylene, butylene, etc.), monovinylidene aromatic hydrocarbons (e.g., styrene; ar-alkylstyrenes such as the o-, m-, and p-methylstyrenes, 2,4-dimethylstyrene, ar-ethylstyrenes, p-t-butylstyrene, etc.; alpha-alkylstyrenes such as alpha-methylstyrene, alpha-ethylstyrene, alpha-methyl-p-methylstyrene, etc., vinyl naphthalene; etc.), ar-halo monovinylidene aromatic hydrocarbons (e.g., the o-, m-, and p-chlorostyrenes, p-bromostyrene, 2-chloro-4-methylstyrene, etc.), alkyl (meth)acrylates (e.g., methyl (meth)acrylate, ethyl (meth)acrylate, propyl (meth)acrylate, butyl (meth)acrylate, 2-ethylhexyl (meth)acrylate, etc.), acrylonitrile, methacrylonitrile, etc., including interpolymers of one or more of such monomers with up to an equal amount by weight of one or more copolymerizable monomers, e.g., conjugated dienes such as butadiene, isoprene, etc.; dialkyl maleates such as diethyl maleate, etc.; dialkyl fumarates such as dibutyl fumarate, etc.; unsaturated amides such as acrylamide, N-butyl acrylamide, methacrylamide, etc. Other solid, thermoplastic polymers which are compatible with polymers which can be prepared by emulsion polymerization will be obvious to those skilled in the art.

A preferred embodiment of the invention is its application to the incorporation of liquid additives into polymers of monovinylidene aromatic hydrocarbons and/or ar-halo monovinylidene aromatic hydrocarbons, particularly the molding-grade polymers having Staudinger average molecular weights above about 50,000. These polymers contain at least 5%, preferably at least 50% by weight of combined monovinylidene aromatic hydrocarbon and/or ar-halo monovinylidene aromatic hydrocarbon and up to 95% by weight of one or more combined comonomers such as an alkyl (meth)acrylate, acrylonitrile, methacrylonitrile, etc., and are sometimes modified with a rubbery polymer (usually a diene rubber such as natural rubber, polybutadiene, polyisoprene, a rubbery interpolymer of butadiene and/or isoprene with one or more copolymerizable monomers such as styrene, alpha-methylstyrene, acrylonitrile, methyl methacrylate, etc.). The rubber-modified polymers include compositions obtained by blending a preformed polymer of a monovinylidene aromatic hydrocarbon and/or ar-halo monovinylidene aromatic hydrocarbon with the rubbery polymer and compositions obtained by polymerizing a monovinylidene aromatic hydrocarbon and/or ar-halo monovinylidene aromatic hydrocarbons-containing monomer charge having the rubbery polymer dissolved therein.

Since the problems associated with incorporating liquid additives into solid, thermoplastic polymers arise because of the liquid nature of the additives rather than because of their chemical compositions, and the present solution to these problems is, in effect, simply an improved method of drying the liquid additives prior to incorporating them into the polymers, it will be readily understood that any of the liquid additives which are conventionally incorporated into solid, thermoplastic polymers can be incorporated by the process of the invention. Among the liquid additives most commonly incorporated into these polymers are flame retardants, plasticizers, stabilizers, lubricants, pneumatogens, etc., e.g., haloalkyl phosphate flame retardants such as tris(2,3-dibromopropyl) phosphate, bis(2-bromoethyl) 2-chloroethyl phosphate, etc.; mineral oils; butyl stearate; dibutyl phthalate; lower alkanes such as the pentanes, hexanes, and heptanes, etc. Such additives are ordinarily incorporated in such amounts as to constitute about 2–25% by weight of the compositions.

The emulsion polymer employed as a drier for the liquid additive can be any substantially anhydrous, porous emulsion polymer which is compatible with the solid, thermoplastic polymer to be modified, preferably an emulsion polymer which has substantially the same chemical composition as the solid, thermoplastic polymer. It is preferred, e.g., to employ an emulsion styrene-acrylonitrile copolymer as the drier when the solid, thermoplastic polymer is a styrene-acrylonitrile copolymer, to employ an emulsion polystyrene as the drier when the solid, thermoplastic polymer is a polystyrene, etc. When the composition containing the liquid additive is to be used in an application which requires optical clarity, it is preferable to employ an emulsion polymer which has been prepared in the presence of an emulsifying agent which is compatible with the solid, thermoplastic polymer because of the difficulty of completely freeing emulsion polymers of contaminating emulsifying agents. Emulsion polymers which have been recovered from their latices under conditions which cause fusion of the polymer particles cannot be employed in the practice of the invention because of their lack of porosity; emulsion polymers which are not substantially anhydrous cannot be employed because of their inability to form concentrates which are sufficiently dry to be easily blended with the solid, thermoplastic polymers.

The liquid additive and emulsion polymer are mixed in such proportions that the concentrate contains about 40–60%, preferably about 50–60%, by weight of the liquid additive. The particular temperature at which they are mixed to form the concentrate is not critical as long as it is below the fusion temperature of the emulsion polymer; they are conveniently mixed at ambient temperatures. The concentrate is easily blended with the solid, thermoplastic polymer to form a dry, easily-processed composition having the desired amount of liquid additive intimately dispersed therein.

The invention is advantageous as an economical means of incorporating liquid additives into solid, thermoplastic polymers so as to prepare dry, easily-processed compositions having the liquid additives uniformly dispersed therein. It is particularly advantageous as a means of preparing dry, easily-processed styrene-type polymers having liquid additives such as haloalkyl phosphate flame retardants intimately dispersed therein.

It is obvious that many variations can be made in the products and processes set forth above without departing from the spirit and scope of this invention.

What is claimed is:

1. A process for incorporating a liquid additive into a solid, comparatively non-absorbent thermoplastic polymer which comprises blending the liquid additive with a substantially anhydrous, comparatively highly absorbent porous emulsion polymer at a temperature below the fusion temperature of the emulsion polymer to form a comparatively dry powder concentrate containing about 40–60% by weight of the liquid additive and blending the concentrate with the solid, comparatively non-absorbent thermoplastic polymer; said emulsion polymer being a polymer which is compatible with the solid, thermoplastic polymer.

2. The process of claim 1 wherein the liquid additive is a flame retardant.

3. The process of claim 1 wherein the liquid additive is a lubricant.

4. The process of claim 1 wherein the liquid additive is a pneumatogen.

5. The process of claim 1 wherein the liquid additive is a plasticizer.

6. The process of claim 1 wherein the solid, thermoplastic polymer is polystyrene.

7. The process of claim 1 wherein the solid, thermoplastic polymer is a styrene-acrylonitrile copolymer.

8. The process of claim 1 wherein the solid, thermoplastic polymer is a styrene-alpha-methylstyrene-acrylonitrile terpolymer.

9. The process of claim 1 wherein the solid, thermoplastic polymer is a rubber-modified polystyrene.

10. The process of claim 1 wherein the solid, thermoplastic polymer is a rubber-modified styrene-acrylonitrile copolymer.

11. The process of claim 1 wherein the emulsion polymer has substantially the same chemical composition as the solid, thermoplastic polymer.

12. The process of claim 1 wherein both the solid, thermoplastic polymer and the emulsion polymer are polymers of a monovinylidene aromatic hydrocarbon.

13. A process for incorporating a liquid haloalkyl phosphate flame retardant into a solid comparatively non-absorbent polystyrene which comprises blending the liquid flame retardant with a substantially anhydrous, comparatively highly absorbent porous emulsion polystyrene at a temperature below the fusion temperature of the emulsion polymer to form a comparatively dry powder concentrate containing about 50–60% by weight of the flame retardant and blending the concentrate with the solid comparatively non-absorbent polystyrene.

14. A process for incorporating a liquid haloalkyl phosphate flame retardant into a solid rubber-modified comparatively non-absorbent polystyrene which comprises blending the liquid flame retardant with a substantially anhydrous, comparatively highly absorbent porous emulsion polystyrene at a temperature below the fusion temperature of the emulsion polymer to form a comparatively dry powder concentrate containing about 50–60% by weight of the flame retardant and blending the concentrate with the solid rubber-modified comparatively non-absorbent polystyrene.

References Cited by the Examiner
UNITED STATES PATENTS

| | | | |
|---|---|---|---|
| 2,530,852 | 11/1950 | Bixby | 260—34.2 |
| 3,090,763 | 5/1963 | Hillier | 260—34.2 |

FOREIGN PATENTS

| | | |
|---|---|---|
| 841,649 | 7/1960 | Great Britain. |

MORRIS LIEBMAN, *Primary Examiner.*

A. LIEBERMAN, *Assistant Examiner.*